US010805367B2

(12) United States Patent
Spalter et al.

(10) Patent No.: US 10,805,367 B2
(45) Date of Patent: Oct. 13, 2020

(54) SYSTEMS AND METHODS FOR SHARING CONTENT

(71) Applicant: Facebook, Inc., Menlo Park, CA (US)

(72) Inventors: Ian Spalter, San Mateo, CA (US); Michel Krieger, San Francisco, CA (US); Ian McIntyre Silber, San Jose, CA (US); Baback Elmieh, Palo Alto, CA (US); John Russell Whaley, San Jose, CA (US); Rex Crossen, Oakland, CA (US); Alexandre Jais, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 19 days.

(21) Appl. No.: 15/858,973

(22) Filed: Dec. 29, 2017

(65) Prior Publication Data
US 2019/0207992 A1   Jul. 4, 2019

(51) Int. Cl.
*H04L 29/06* (2006.01)
*H04L 12/58* (2006.01)
*H04N 7/18* (2006.01)
*G06F 16/958* (2019.01)
*H04N 21/2743* (2011.01)

(52) U.S. Cl.
CPC ........ *H04L 65/4076* (2013.01); *G06F 16/958* (2019.01); *H04L 51/32* (2013.01); *H04L 65/602* (2013.01); *H04L 65/608* (2013.01); *H04N 7/188* (2013.01); *H04N 21/2743* (2013.01)

(58) Field of Classification Search
CPC ...................................................... H04L 51/32
See application file for complete search history.

(56) References Cited

U.S. PATENT DOCUMENTS

| | | | |
|---|---|---|---|
| 6,492,998 B1* | 12/2002 | Kim .................... | G06F 16/745 715/723 |
| 6,636,259 B1* | 10/2003 | Anderson .......... | H04N 1/00151 348/211.3 |
| 8,472,662 B2* | 6/2013 | Muriello ............... | G06Q 50/01 382/100 |
| 8,701,166 B2* | 4/2014 | Courtney ............... | G06F 21/36 726/5 |
| 8,818,022 B2* | 8/2014 | Muriello .......... | H04N 21/44008 382/100 |
| 8,924,993 B1* | 12/2014 | Niebles Duque ...... | G06F 16/70 725/9 |
| 9,256,859 B2* | 2/2016 | Olsen ..................... | H04L 51/32 |
| 9,602,605 B2* | 3/2017 | Wang ..................... | H04L 51/32 |
| 9,699,375 B2* | 7/2017 | Fan .......................... | G06T 7/70 |
| 9,876,831 B1* | 1/2018 | Leske ................ | H04L 12/1818 |
| 10,382,373 B1* | 8/2019 | Yang ..................... | G06F 16/55 |
| 10,523,976 B2* | 12/2019 | Hemmati ........... | H04N 21/4788 |
| 2007/0078013 A1* | 4/2007 | Simmons ............... | A63G 31/00 472/60 |

(Continued)

*Primary Examiner* — Lashonda T Jacobs
(74) *Attorney, Agent, or Firm* — Sheppard Mullin Richter & Hampton LLP

(57) ABSTRACT

Systems, methods, and non-transitory computer-readable media can determine at least one media content item that was captured and provided by a camera device; determine at least one story associated with the camera device, the story publishable through a social networking system; and publish the at least one media content item in the story publishable through the social networking system.

20 Claims, 8 Drawing Sheets

(56) References Cited

U.S. PATENT DOCUMENTS

| | | | | |
|---|---|---|---|---|
| 2009/0278949 | A1* | 11/2009 | McMahan | G06F 16/583 348/222.1 |
| 2012/0221687 | A1* | 8/2012 | Hunter | G06F 16/435 709/219 |
| 2013/0091213 | A1* | 4/2013 | Diab | H04L 67/306 709/204 |
| 2013/0282821 | A1* | 10/2013 | Muriello | H04L 67/10 709/204 |
| 2014/0032666 | A1* | 1/2014 | Chan | H04L 67/02 709/204 |
| 2014/0148219 | A1* | 5/2014 | Bai | H04N 5/2354 455/556.1 |
| 2014/0282240 | A1* | 9/2014 | Flynn, III | G06F 9/451 715/810 |
| 2014/0313352 | A1* | 10/2014 | De Rosa | H04N 1/32133 348/207.2 |
| 2014/0317194 | A1* | 10/2014 | De Rosa | H04N 1/00156 709/204 |
| 2015/0178717 | A1* | 6/2015 | Boras | G06Q 20/32 705/40 |
| 2015/0295867 | A1* | 10/2015 | DeLuca | H04L 51/10 709/206 |
| 2016/0036809 | A1* | 2/2016 | Bhimanaik | H04L 65/60 726/4 |
| 2016/0062483 | A1* | 3/2016 | Baldwin | H04W 4/026 345/156 |
| 2016/0127641 | A1* | 5/2016 | Gove | G01B 11/00 348/143 |
| 2016/0308813 | A1* | 10/2016 | Kalajan | H04N 21/80 |
| 2016/0357352 | A1* | 12/2016 | Matas | H04N 21/475 |
| 2016/0381341 | A1* | 12/2016 | El Choubassi | H04N 13/271 348/43 |
| 2017/0125059 | A1* | 5/2017 | Zich | G11B 27/034 |
| 2018/0025220 | A1* | 1/2018 | Dickinson | H04N 5/2259 382/103 |
| 2018/0241871 | A1* | 8/2018 | Sarafa | H04L 9/0827 |
| 2018/0295092 | A1* | 10/2018 | Peiris | H04L 51/16 |
| 2019/0132492 | A1* | 5/2019 | Paluri | H04N 21/4788 |
| 2019/0132613 | A1* | 5/2019 | Jiao | H04N 21/63 |
| 2019/0147017 | A1* | 5/2019 | Tran | G06F 3/0485 715/720 |
| 2019/0174098 | A1* | 6/2019 | Smith | G08B 29/185 |
| 2019/0190869 | A1* | 6/2019 | Peiris | G06Q 50/01 |
| 2019/0208116 | A1* | 7/2019 | Paul | G06F 3/167 |

* cited by examiner

SYSTEMS AND METHODS FOR SHARING CONTENT

FIELD OF THE INVENTION

The present technology relates to the field of content sharing. More particularly, the present technology relates to techniques for sharing content through a content provider.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

SUMMARY

Various embodiments of the present disclosure can include systems, methods, and non-transitory computer readable media configured to determine at least one media content item that was captured and provided by a camera device; determine at least one story associated with the camera device, the story publishable through a social networking system; and publish the at least one media content item in the story publishable through the social networking system.

In an embodiment, the systems, methods, and non-transitory computer readable media are configured to determine at least one story linked to the camera.

In an embodiment, the systems, methods, and non-transitory computer readable media are configured to determine at least one mood of at least one individual represented in subject matter captured by the at least one media content item; and determine at least one story corresponding to the at least one mood.

In an embodiment, the systems, methods, and non-transitory computer readable media are configured to determine a point of interest associated with the camera device and determine at least one story corresponding to the point of interest.

In an embodiment, the camera device is configured to automatically capture and provide the at least one media content item when one or more conditions are satisfied.

In an embodiment, a given condition requires that a threshold number of individuals be present within a viewfinder of the camera device.

In an embodiment, a given condition requires that a threshold number of individuals present within a viewfinder of the camera device satisfy a facial expression requirement.

In an embodiment, the systems, methods, and non-transitory computer readable media are configured to determine a live content stream being captured and provided by the camera device and publish the live content stream through the social networking system In an embodiment, the systems, methods, and non-transitory computer readable media are configured to determine one or more users represented in subject matter captured by the at least one media content item; and provide the at least one media content item in one or more messages sent to the one or more users, the messages being sent through the social networking system.

In an embodiment, the systems, methods, and non-transitory computer readable media are configured to determine one or more other users related to a given user represented in subject matter captured by the at least one media content item, wherein the other users are not represented in the captured subject matter; and provide the at least one media content item in one or more messages sent to the other users, the messages being sent through the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
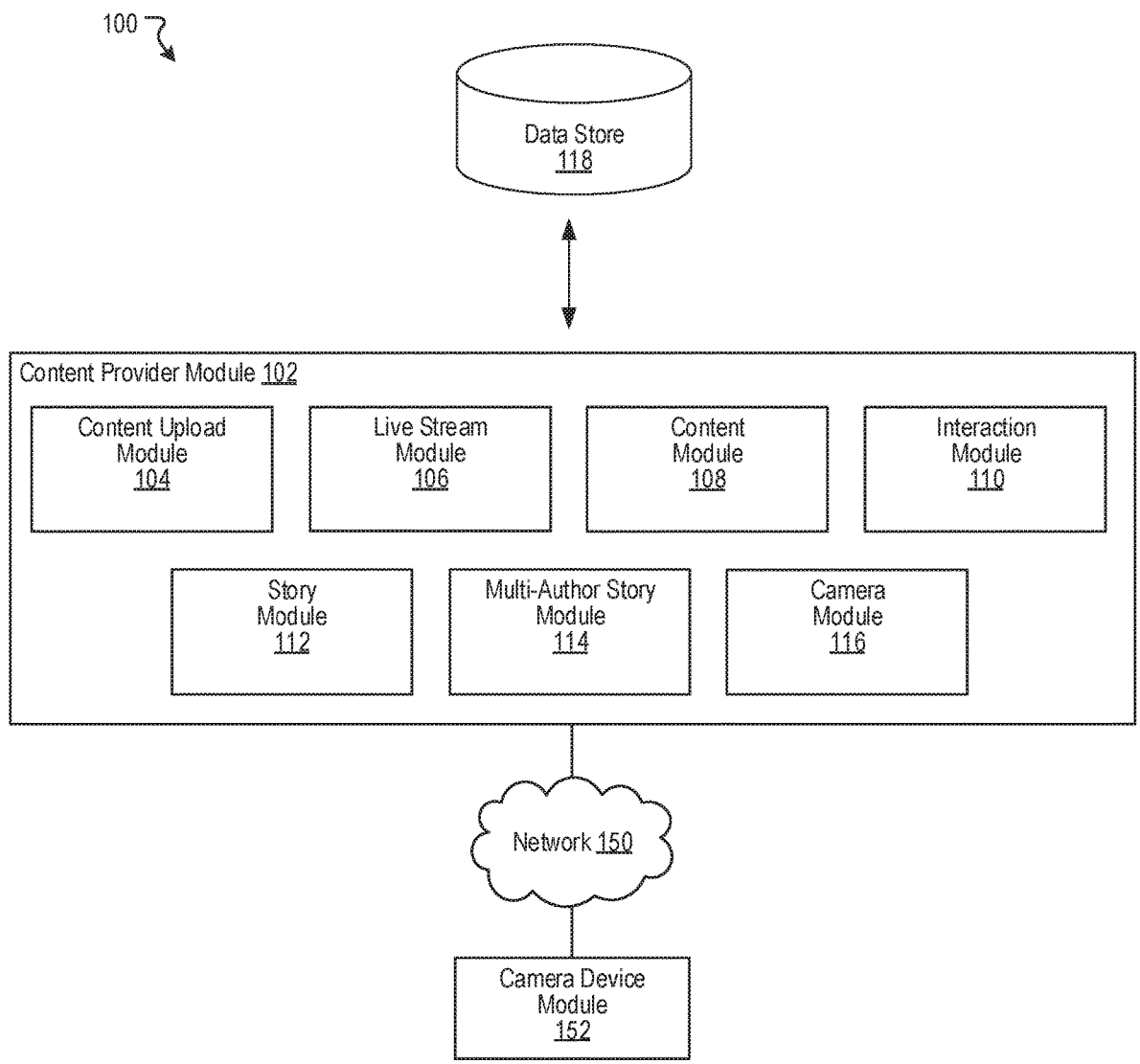
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

Under conventional approaches, content may be posted and/or broadcast through a content provider (e.g., social networking system). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. The content provider encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream, for example. In some instances, however, it can be beneficial for content to be posted and/or live streamed from various geographic locations (e.g., points of interest) without requiring user operated computing devices. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a camera device can be used to capture and share content through a content provider (e.g., social networking system). For example, the camera device can be installed at a fixed location (e.g., theme park ride entrance, office break room, etc.). In this example, individuals can interact with the camera device to share content through a content provider, such as the social networking system. For example, in some embodiments, the camera device can capture and provide media content items (e.g., images, videos, looping videos, etc.) to be shared as posts and/or stories through the social networking system. In some embodiments, the camera device can capture and provide media content items to an individual or a group of individuals as messages sent through the social networking system. In some embodiments, the camera device can be used to capture live content streams to be broadcasted through the social networking system. Many variations are possible.

FIG. 1 illustrates an example system 100 including an example content provider module 102, according to an embodiment of the present disclosure. As shown in the example of FIG. 1, the content provider module 102 can include a content upload module 104, a live stream module 106, a content module 108, an interaction module 110, a story module 112, a multi-author story module 114, and a camera module 116. In some instances, the example system 100 can include at least one data store 118. A camera device module 152 can interact with the content provider module 102 over one or more networks 150 (e.g., the Internet, a local area network, a cellular network, etc.). The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 and/or the camera device module 152 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 and/or the camera device module 152 can, in part or in whole, be implemented within or configured to operate in conjunction with a social networking system (or service), such as the social networking system 630 of FIG. 6.

The content provider module 102 can be configured to communicate and/or operate with the at least one data store 118, as shown in the example system 100. The at least one data store 118 can be configured to store and maintain various types of data. For example, the data store 118 can store information describing various content that has been posted by users of a social networking system and/or by camera devices interacting with the social networking system. In some implementations, the at least one data store 118 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 118 can store information associated with users, such as user identifiers, user information, profile information, user specified settings, content produced or posted by users, and various other types of user data.

The content provider module 102 can be configured to provide users with access to media content items that are posted through a social networking system. In general, a media content item may correspond to an image, text, audio, video, or looping video, to name some examples. For example, a user can interact with an interface that is provided by a software application (e.g., a social networking application) running on a computing device of the user. This interface can include an option for posting, or uploading, media content items to the social networking system. When posting a media content item, the content upload module 104 can be utilized to communicate data describing the media content item from the computing device to the social networking system. The social networking system can then provide the media content item through the social networking system including, for example, in one or more news feeds and/or stories. In some embodiments, media content items can be posted, or uploaded, to the social networking system by a camera device in which the camera device module 152 is implemented.

In some embodiments, users can live stream content through the social networking system. When initiating a live content stream, the live stream module 106 can be utilized to communicate data (e.g., audio data, video data, etc.) corresponding to the content to be streamed live from a computing device and through the social networking system. In some embodiments, this computing device can be a camera device in which the camera device module 152 is implemented. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream.

In some embodiments, users can access posted media content items, for example, using the content module 108. For example, the content module 108 can include media content items in a user's news feed. Such media content items may include on-demand media content items (e.g., video on-demand or "VOD") as well as content that is being streamed live. In this example, the user can access media content items while browsing the news feed. In another example, the user can access media content items by performing searches through the social networking system. For example, the user can search for a given media content item, for a user that posted a media content item, and/or for search terms that correspond to a media content item. In one example, the user may select an option to view a live content stream and, in response, the social networking system can send data corresponding to the live content stream to a computing device of the user. In this example, the social networking system can continue sending data corresponding to the live content stream until, for example, the broadcaster of the live content stream discontinues streaming or if the user selects an option to discontinue playback of the live content stream.

In some embodiments, when a user accesses a media content item or live content stream, the accessed content is presented through a display screen of the user's computing device. In some embodiments, the user can select a number of options to provide various types of feedback for media content items and/or live content streams. For example, a user may want to endorse, or "like", a media content item. In this example, the user can select a "like" option provided in the interface to like, or endorse, the media content item. The interaction module 110 can determine when a user likes a given media content item and can store information describing this relationship. In some embodiments, the interface includes a set of options for reacting to content being presented in the media content item. These options can include a "love" reaction option, a "haha" (or funny) reaction option, a "wow" (or surprised) reaction option, a "sad" reaction option, and an "angry" reaction option, to name some examples. Similarly, the interaction module 110 can determine when a user selects a reaction option in response to a given media content item and can store information describing this relationship. The interaction module 110 can also determine when other forms of user interaction are performed and can store information describing such interactions (e.g., information describing a type of interaction, an identity of the user, an identity of a broadcaster, and an identifier for the media content item, to name some examples). For example, a viewer may want to post a comment in response to a live content stream. In this example, the viewer can select an option provided in the interface to enter and post the comment for the desired live content stream. The interaction module 110 can determine when a viewer posts a comment in response to a given live content stream and can store information describing this relationship. In some embodiments, the interaction module 110 can determine when users share media content items with other users and can store information describing such relationships.

In some embodiments, the story module 112 can provide an option that allows users to post media content items as stories (e.g., single-author stories). In such embodiments, each user has a corresponding story in which the user can post content. When a user's story is accessed by another user, the story module 112 can provide content posted in the story to the other user for viewing. In general, content posted in a user's story may be accessible by any user of the social networking system. In some embodiments, content posted in a user's story may only be accessible to followers (or friends) of the user. In some embodiments, user stories expire after a pre-defined time interval (e.g., every 24 hours). In such embodiments, content posted in stories is treated as ephemeral content that is made inaccessible once the pre-defined time interval has elapsed. In contrast, content posted in a user's content feed (or news feed) can be treated as non-ephemeral content that remains accessible for an indefinite period of time.

In some embodiments, the multi-author story module 114 can be configured to generate multi-author stories by grouping media content items posted by various users through the social networking system. In some embodiments, the media content items being grouped may be selected from among media content items that were posted by users in their respective stories (e.g., ephemeral content), content that was posted by users in their respective content feeds (e.g., non-ephemeral content), or a combination thereof. When generating a multi-author story, the multi-author story module 114 can group content based on various criteria associated with the multi-author story being generated. For example, when generating a multi-author story that corresponds to a particular geographic region (e.g., New York, N.Y.), the multi-author story module 114 can group media content items that relate to (or originate from) the city of New York.

The camera module 116 can be configured to publish content captured by the camera device module 152 through the social networking system. In some embodiments, the camera module 116 can post media content items in one or more stories (e.g., single-author stories, multi-author stories). For example, a camera device in which the camera device module 152 is implemented can capture and provide content to the camera module 116 over the network 150. In some embodiments, the camera device module 152 can determine stories in which the captured content is to be published. For example, a camera device in which the camera device module 152 is implemented can be linked to (or associated with) one or more stories that are accessible through the social networking system. In this example, the camera device module 152 can provide the captured content with information that identifies these linked stories in which the captured content is to be published. The camera module 116 can then post the content in the linked stories. For example, a camera device installed at a theme park ride may be linked to a story associated with the ride. In this example, content captured by the camera device can be published through the social networking system within the linked story. In general, users can access this story like any other story published through the social networking system. In some embodiments, the camera module 116 can authenticate the camera device before posting any content received from the camera device. For example, the camera module 116 may authenticate the camera device based on login credentials (e.g., username and password, cryptographic token, etc.) provided by the camera device.

In various embodiments, the camera device module 152 can be configured to capture and provide content to be published through the content provider module 102. For example, the camera device module 152 can provide captured content (e.g., images, videos, looping videos, etc.) to the content provider module 102 over the network 150 for publication in one or more stories. In another example, the camera device module 152 can provide a live content stream to the content provider module 102 over the network 150 for broadcasting. In some embodiments, the camera device module 152 can be implemented as a software application running on a computing device (e.g., camera device). More details regarding the camera device module 152 will be provided below with reference to FIG. 2.

Figure 2:
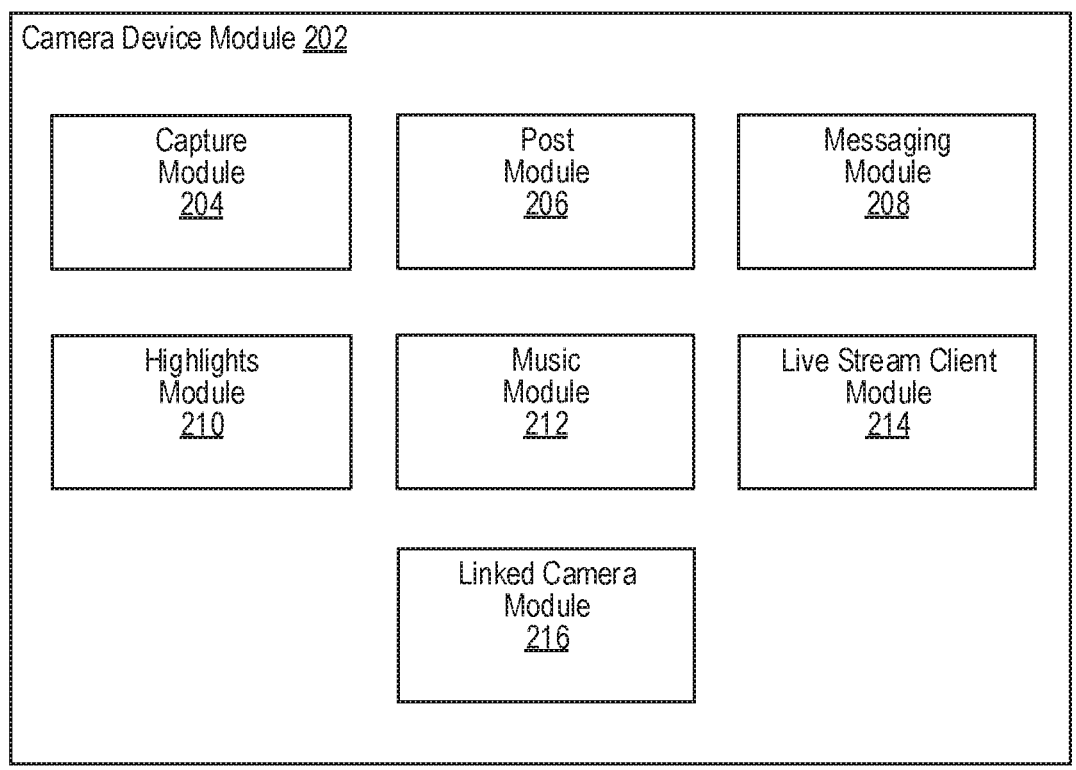
FIG. 2 illustrates an example of a camera device module, according to an embodiment of the present disclosure.

FIG. 2 illustrates an example of a camera device module 202, according to an embodiment of the present disclosure. In some embodiments, the camera device module 152 of FIG. 1 can be implemented as the camera device module 202. As shown in FIG. 2, the camera device module 202 can include a capture module 204, a post module 206, a messaging module 208, a highlights module 210, a music module 212, a live stream client module 214, and a linked camera module 216.

In various embodiments, the camera device module 202 can be implemented in a camera device that is capable of capturing and storing subject matter as media content items (e.g., images, videos, looping videos, etc.). The camera device can also be configured to interact with a social networking system (e.g., the content provider module 102 of FIG. 1) through which captured media content items can be published. In some embodiments, the camera device module 202 can also provide a live broadcasting option that can be selected to broadcast live content streams through the social networking system. In some instances, the camera device can be installed at a fixed geographic location or point of interest.

The capture module 204 can be configured to capture various subject matter using the camera device. Such subject matter can be stored as media content items (e.g., images, videos, looping videos, etc.). In some embodiments, the capture module 204 can be instructed to capture media content items based on user commands applied to the camera device. For example, the camera device can be equipped with options (e.g., buttons) which, when selected, cause the capture module 204 to capture subject matter using the camera device. In some embodiments, the camera device can be configured to automatically capture media content items without manual commands or prompting. For example, the capture module 204 can be configured to periodically (or continuously) evaluate subject matter positioned within a viewfinder of the camera device. During evaluation, the capture module 204 can determine whether the subject matter satisfies any conditions for automatically capturing media content items. For example, a condition for automatically capturing media content items may require that a threshold number of individuals (e.g., one or more individuals) be positioned within the viewfinder of the camera device. In this example, the camera device can be instructed to capture one or more media content items once a threshold number of individuals are detected within the viewfinder. In another example, a condition for automatically capturing content may require that one or more individuals positioned within the viewfinder be smiling or otherwise exhibit a particular expression. In this example, the camera device can automatically capture one or more media content items once individuals detected within the viewfinder are determined to be smiling. In yet another example, a condition for automatically capturing content may require that one or more individuals positioned within the viewfinder are looking at the camera device. In this example, the camera device can be instructed to capture one or more media content items once individuals detected within the viewfinder are determined to be gazing at the camera device. Many variations are possible. In some embodiments, the camera device includes a set of light emitting diodes (LEDs) that can be used to communicate information. For example, in some embodiments, the LEDs are used to simulate a countdown before the camera device captures a media content item.

In various embodiments, the capture module 204 can use one or more trained machine learning models to evaluate captured subject matter. For example, a machine learning model (image classifier) can be trained to identify features that are represented in captured subject matter. These features can include identities, or names, of individuals, objects, activities, facial expressions, gaze direction, and moods, to name some examples. Such features can be used by the capture module 204 to determine when to automatically capture content. In some embodiments, when storing captured subject matter as a media content item, the capture module 204 can associate the media content item with information describing features that were detected in the captured subject matter. For example, a media content item (e.g., image) of an individual may be associated with detected information indicating the individual's name (or username), facial expression, mood, and geographic location.

The post module 206 can be configured to post media content items captured by the camera device. In general, media content items may be posted in user-specific content feeds or stories. For example, in some embodiments, a media content item in which a first user is represented can be posted in a content feed associated with the first user and/or respective content feeds of users that are followers (or friends of) the first user.

In some embodiments, the post module 206 can determine stories in which media content items captured by the camera device are to be published. Once determined, the post module 206 can associate media content items with corresponding information that specifies stories in which the media content items are to be published. For example, in some embodiments, a camera device can be linked to one or more stories that are accessible through the social networking system. In such embodiments, content captured by the camera device can automatically be published in the linked stories and be made accessible through the social networking system. For example, a camera device installed at a company's headquarters can be linked to a story associated with the company's headquarters. In this example, content captured by the camera device can automatically be published in the linked story and be made accessible through the social networking system.

In some embodiments, the post module 206 can determine stories in which a media content item is to be published based on moods (e.g., happy, sad, angry, etc.) represented in the media content item. For example, moods of individuals represented in a media content item can be detected using one or more trained machine learning models, as described above. In some embodiments, once a general mood is identified, the post module 206 can associate the media content item with information that specifies the detected mood. In this example, the media content item can automatically be published in a mood-specific story (or feed) and be made accessible through the social networking system. In some embodiments, if multiple moods are detected, the media content item can automatically be published in corresponding mood-specific stories and be made accessible through the social networking system.

In some embodiments, the post module 206 can determine stories in which a media content item is to be published based on a geographic location (or point of interest) at which the media content item was captured. For example, when capturing a media content item, the post module 206 can associate the media content item with information that specifies the geographic location (or point of interest) at which the camera device is installed. In this example, the media content item can automatically be published in a story (or feed) corresponding to the geographic location (or point of interest) and be made accessible through the social networking system.

The messaging module 208 can be configured to send captured content as messages (e.g., instant messages) to one or more recipients. For example, in some embodiments, a captured media content item can be sent directly to a group of recipients through the social networking system. In some embodiments, recipients of the media content item can be determined based on subject matter captured in the media content item. As mentioned, one or more trained machine learning models can be used to identify individuals represented in a media content item. In some embodiments, the messaging module 208 can automatically send the media content item to the identified individuals through the social networking system. The media content item may be sent as a separate message to each individual or as a group message to all of the individuals, for example. Any generally known approach for detecting the presence of individuals can be used to identify individuals related to a given media content item. For example, in some embodiments, individuals may be identified based on their respective mobile devices being detected by the camera device in which the camera device module 202 is implemented.

In some embodiments, recipients of a media content item may include users that are not represented in a captured media content item. For example, in some embodiments, individuals represented in the captured media content item can be identified, as described above. In such embodiments, the messaging module 208 can identify other users that relate to the individuals identified in the media content item. For example, in some embodiments, other users that relate to a given individual may be identified based on their respective affinity to the individual. In this example, users having a threshold affinity to the individual can be added as recipients of the media content item. In general, an affinity (or affinity score) between a pair of users can measure how frequently the users interact with one another. Other approaches for sharing media content items are possible. For example, in some embodiments, users that frequently exchange messages with an individual represented in a media content item can be added as recipients of the media content item. In some embodiments, users that follow (or are friends of) a given individual represented in a media content item within a social networking system can be added as message recipients of the media content item.

The highlights module 210 can be configured to generate highlight reels using content that was captured by the camera device. For example, the highlights module 210 can identify content that was captured over some period of time (e.g., hour, day, week, or any other custom defined period of time). The highlights module 210 can then generate a highlight reel that corresponds to that period of time using the identified content. In general, a highlight reel can be a compilation of media content items that correspond to a given period of time. The highlight reel can automatically be published in a story and be made accessible through the social networking system. In some embodiments, the highlight reel is published in a story that is linked to the camera device in which the camera device module 202 is implemented.

The music module 212 can be configured to add background music to media content items captured by the camera device. For example, in some embodiments, the music module 212 can add background music to videos captured by the camera device. In another example, the music module 212 can add background music to highlight reels generated by the camera device. In some embodiments, the type of background music added can be determined based on moods detected in the captured subject matter. For example, the music module 212 can add uplifting music when a happy mood is detected.

As mentioned, the camera device module 202 can provide an option to broadcast live content streams through the social networking system. When this option is selected, the live stream client module 214 can interact with the live stream module 106 of FIG. 1 for purposes of streaming live content captured by the camera device module 202. The live stream client module 214 can implement any generally known techniques that allow for live streaming of content including, for example, the Real Time Messaging Protocol (RTMP).

In some embodiments, the camera device in which the camera device module 202 is implemented can be linked with other camera devices that also implement the camera device module 202. In such embodiments, these linked camera devices can be placed in different geographic locations (e.g., throughout a venue). In various embodiments, content captured by linked camera devices can be collected and published. For example, the linked camera module 216 may associate captured content with information identifying a set of linked camera devices. Each of the linked camera devices can send their captured content to the social networking system. In this example, some, or all, content captured by the linked camera devices can be compiled and published by the social networking system.

Figure 3:
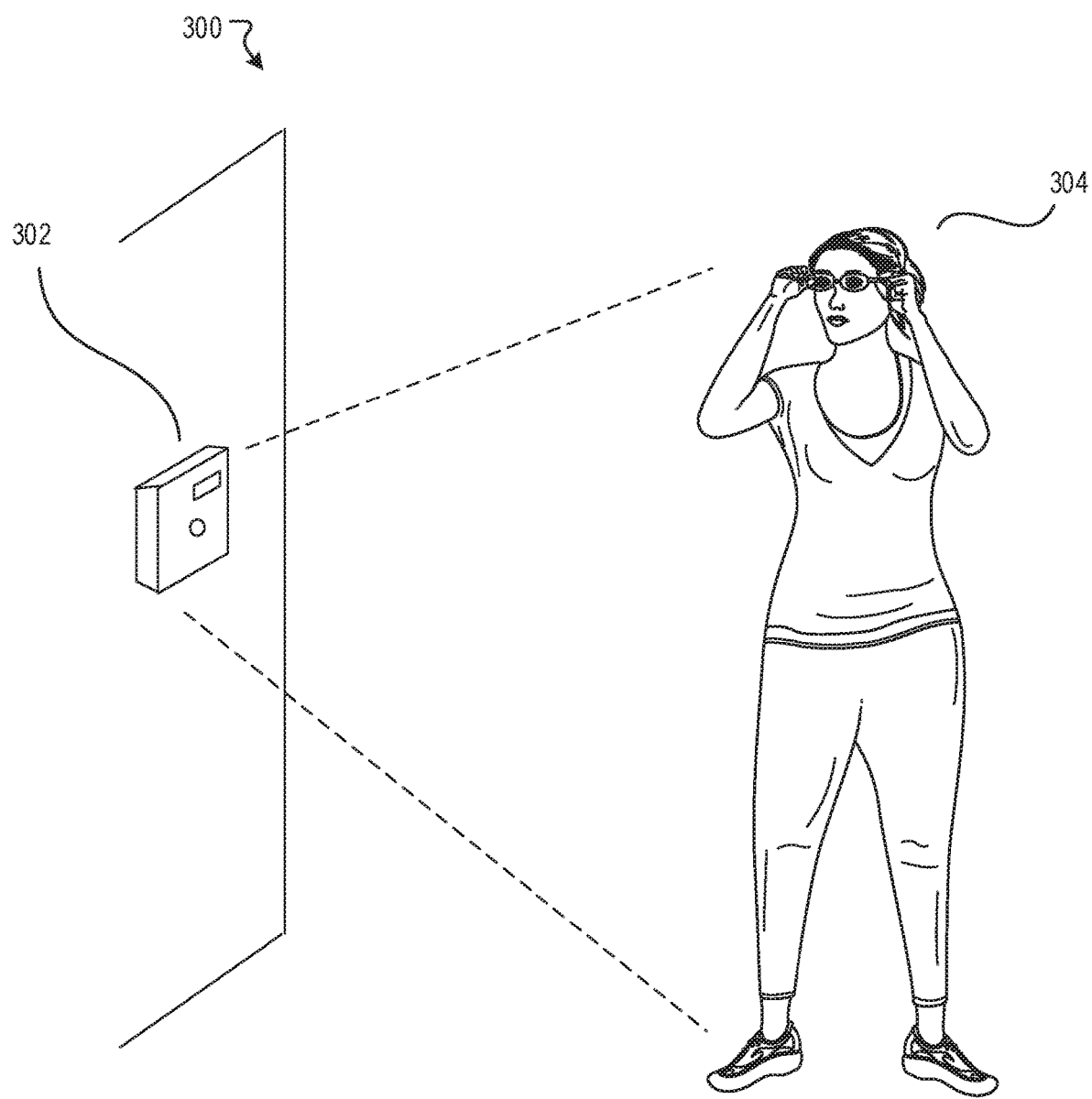
FIG. 3 illustrates an example diagram, according to an embodiment of the present disclosure.
Figure 4A:
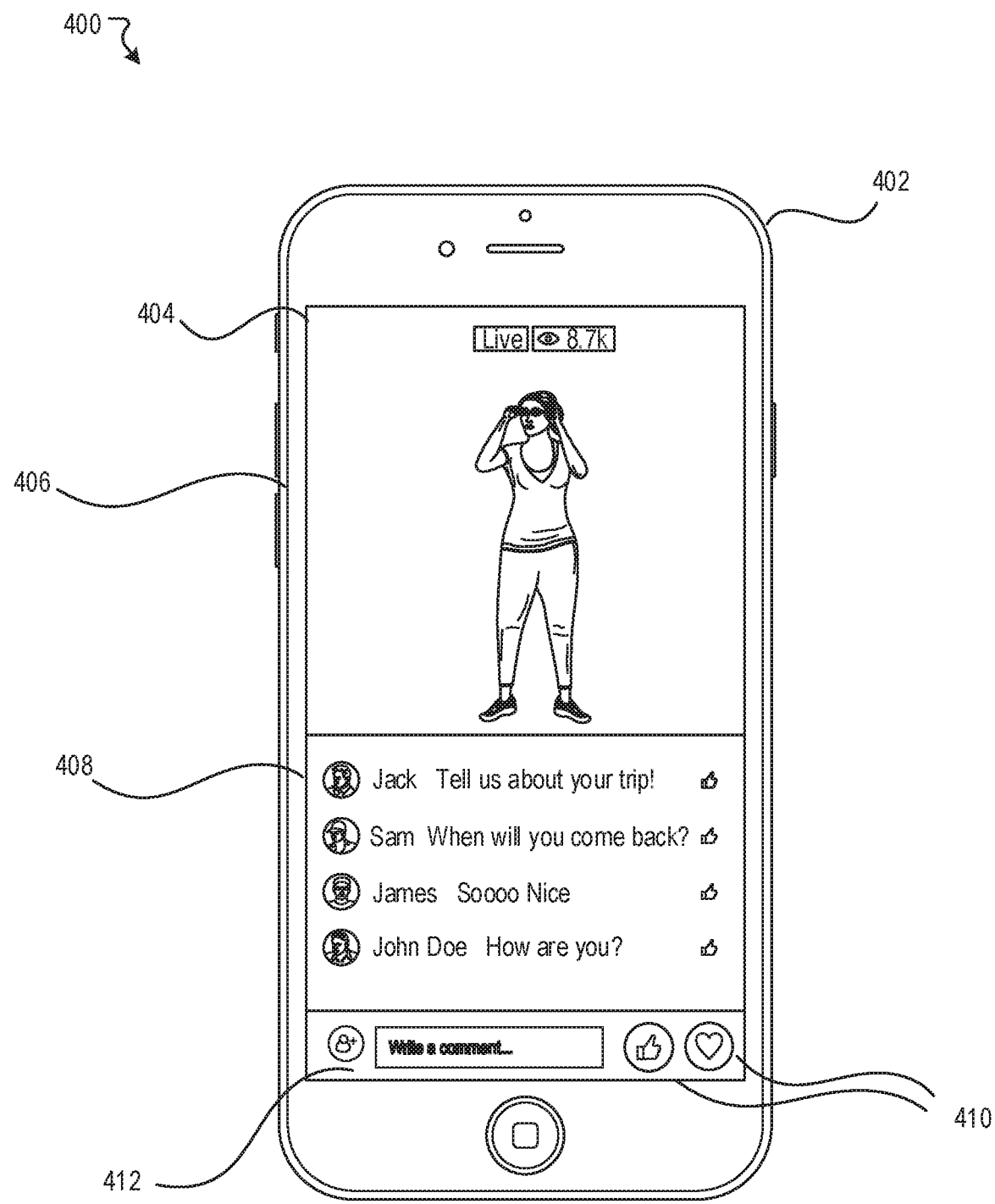
FIGS. 4A-4B illustrate example interfaces, according to an embodiment of the present disclosure.

FIG. 3 illustrates an example diagram 300, according to an embodiment of the present disclosure. The example diagram 300 includes a camera device 302 and an individual 304. In this example, the camera device 302 can implement the camera device module 152 of FIG. 1. In some embodiments, the camera device 302 can be instructed to capture a live content stream of the individual 304. In such embodiments, the live content stream can be broadcasted through a social networking system, as described above. Users can access and interact with the live content stream through the social networking system, as illustrated in the example of FIG. 4A. In some embodiments, the camera device 302 can be configured to capture media content items to be published through the social networking system. For example, the captured media content items may be shared through the social networking system as posts in content feeds or as stories. Users can access and interact with the media content items through the social networking system, as illustrated in the example of FIG. 4B.

FIG. 4A illustrates an example 400 of an interface 404 for interacting with a broadcaster of a live content stream, according to an embodiment of the present disclosure. In some embodiments, the live content stream may be captured by a camera device in which the camera device module 152 of FIG. 1 is implemented. The camera device may be installed at a given geographic location. Further, this camera device can be configured to stream the live content through a content provider (e.g., social networking system). In this example, the interface 404 is presented on a display screen of a computing device 402 of a user viewing the live content stream. The interface 404 may be provided through an application (e.g., a web browser, a social networking application, etc.) running on the computing device 402. In this example, the interface 404 includes a region 406 in which the live content stream being accessed is displayed. The interface 404 also includes a region 408 in which comments posted by various users in response to the live content stream are displayed. The region 408 also includes a field 412 through which the user operating the computing device can input comments to be posted in the region 408. The region 408 also includes a number of feedback options 410 (e.g., like option, reaction options, etc.) that can be selected to interact with the broadcaster.

Figure 4B:
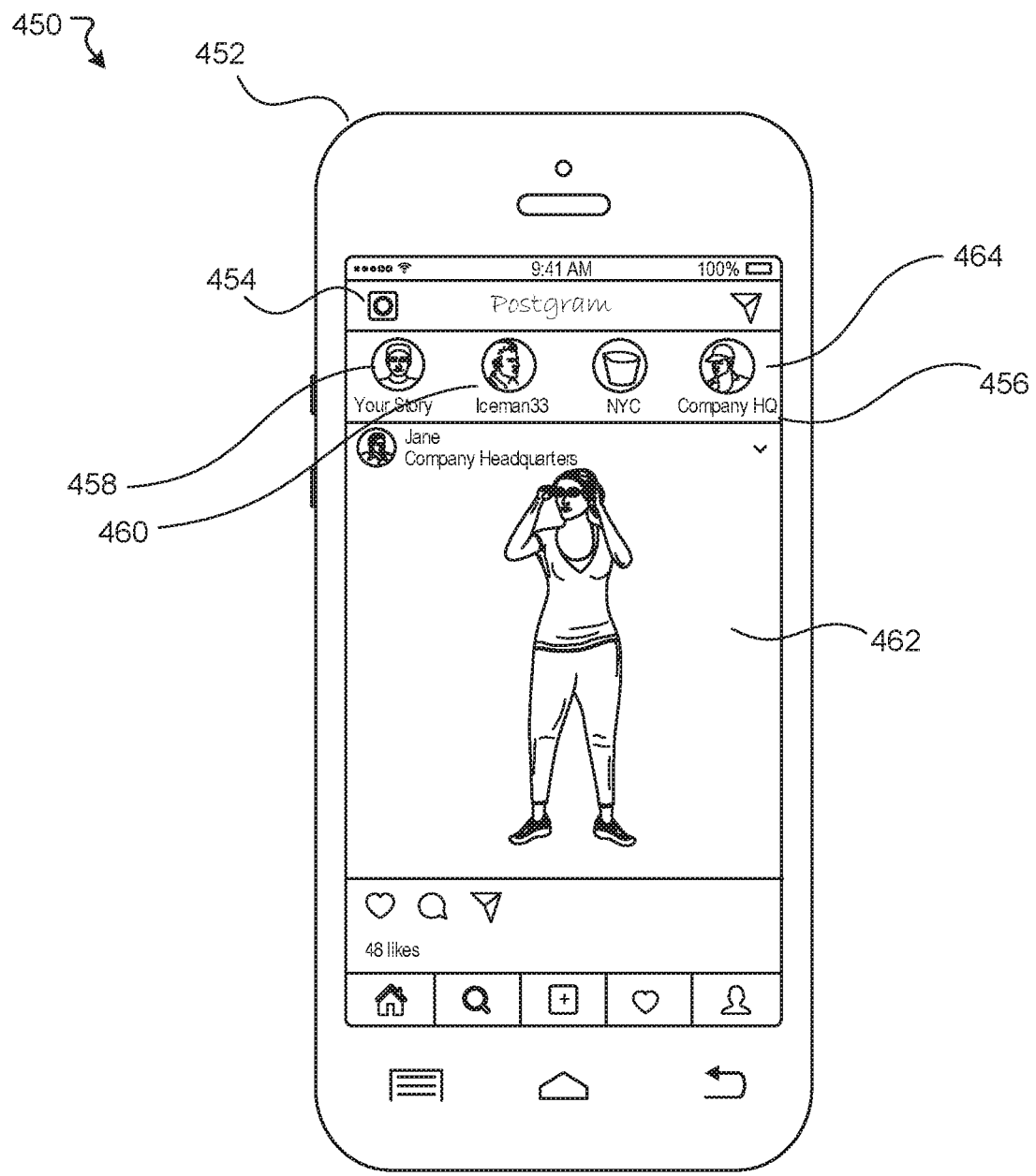

FIG. 4B illustrates an example 450 of an interface 454, according to an embodiment of the present disclosure. In this example, the interface 454 is presented through a display screen of a computing device 452. Further, the interface 454 may be provided through an application (e.g., a web browser, a social networking application, messenger application, etc.) running on the computing device 452 that is configured to interact with a social networking system. In the example of FIG. 4B, the interface 454 provides access to stories through a first region 456 of the interface 454 and access to a content feed of a user operating the computing device 452 through a second region 462 of the interface 454. In this example, the first region 456 includes a story 458 corresponding to the user operating the computing device 452 and a story 460 corresponding to another user of the social networking system. As mentioned, the user can post content items to the story 458. Content items posted in the user's story 458 can be accessed by other users of the social networking system. Further, the user can access the story 460 to view content items that were posted by the other user. In some embodiments, a camera device in which the camera device module 152 of FIG. 1 is implemented can be configured to capture media content items. In such embodiments, these media content items can be published through one or more stories. For example, a story 464 ("Company HQ") may be linked to the camera device. In this example, media content items captured by the camera device can be included in the story 464. Users can access these media content items by selecting the story 464 through the interface 454, for example.

Figure 5:
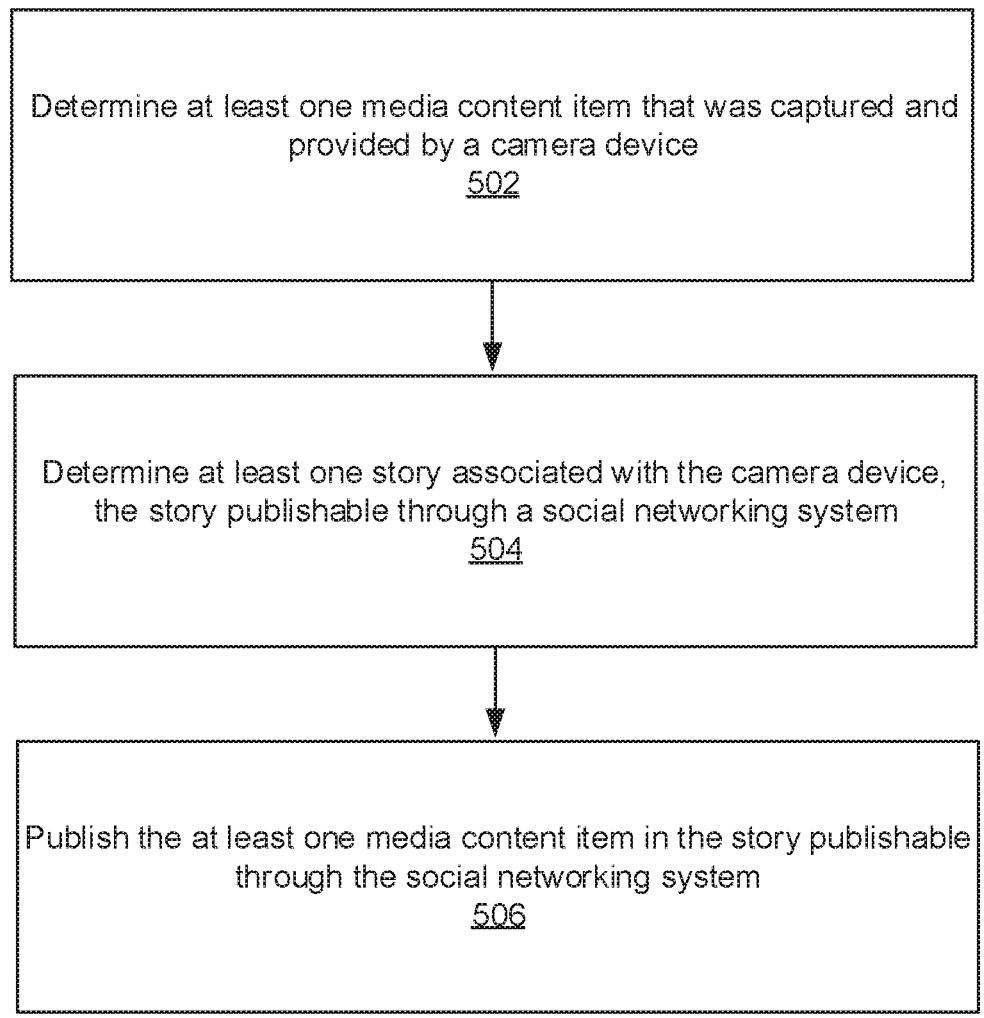
FIG. 5 illustrates an example process, according to various embodiments of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a determination is made that at least one media content item that was captured and provided by a camera device. At block 504, at least one story associated with the camera device is determined. The story is publishable through a social networking system. At block 506, the at least one media content item can be included in the story publishable through the social networking system.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
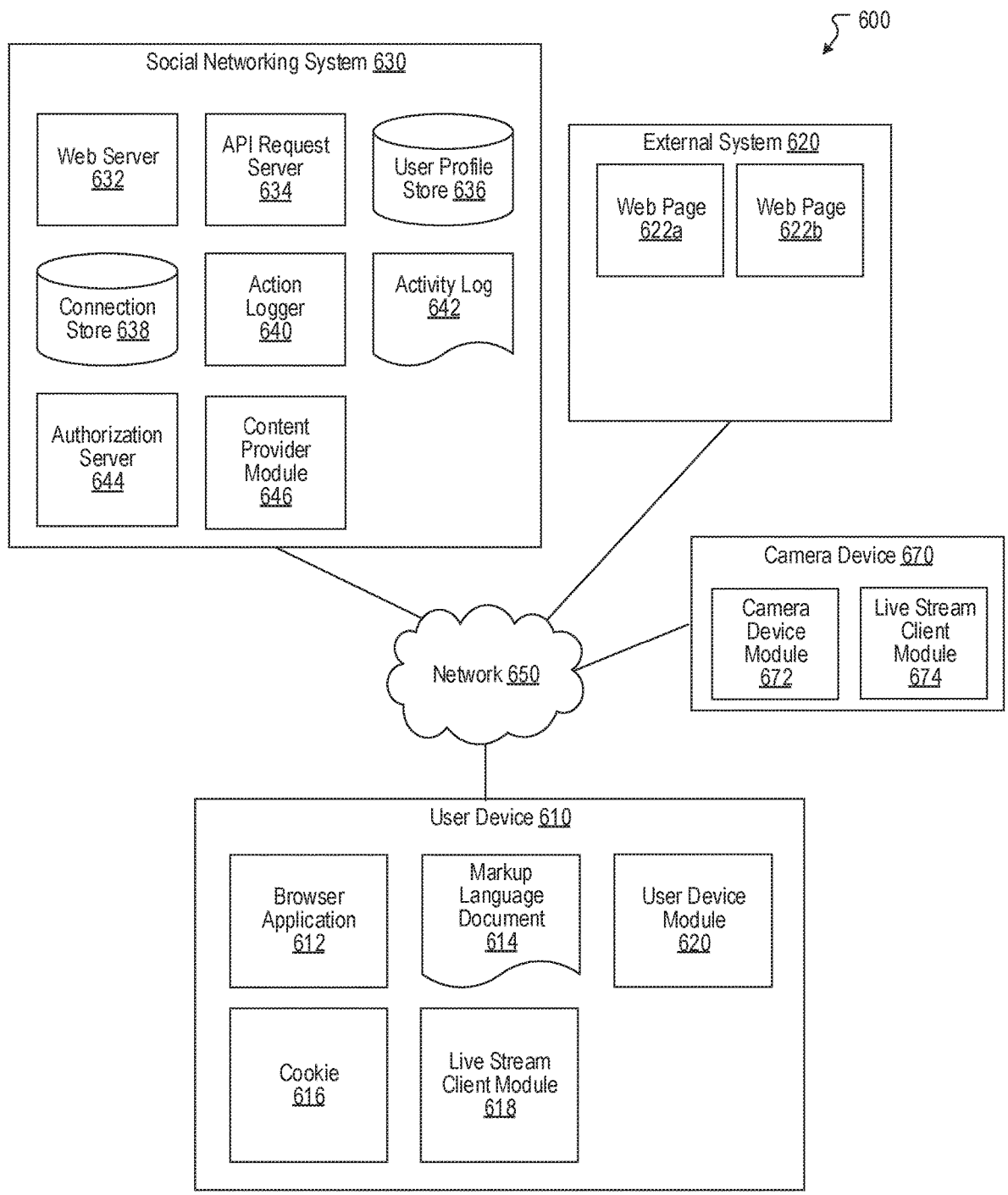
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a live stream client module 618. The live stream client module 618 can be configured to interact with the live stream module 106, for example, for purposes of streaming live content captured by the user device 610. The live stream client module 618 can implement any generally known techniques that allow for live streaming of content including, for example, the Real Time Messaging Protocol (RTMP). The user device module 620 can be implemented as the camera device module 152 of FIG. 1. In some embodiments, a camera device 670 can be configured to interact with the social networking system 630. The camera device 670 can include a camera device module 672 and a live stream client module 674. In some embodiments, the camera device module 672 can be implemented with the camera device module 152. In some embodiments, the live stream client module 674 can be configured to interact with the live stream module 106, for example, for purposes of streaming live content captured by the camera device 670. As discussed previously, it should be appreciated that there can be many variations or other possibilities.

Hardware Implementation

Figure 7:
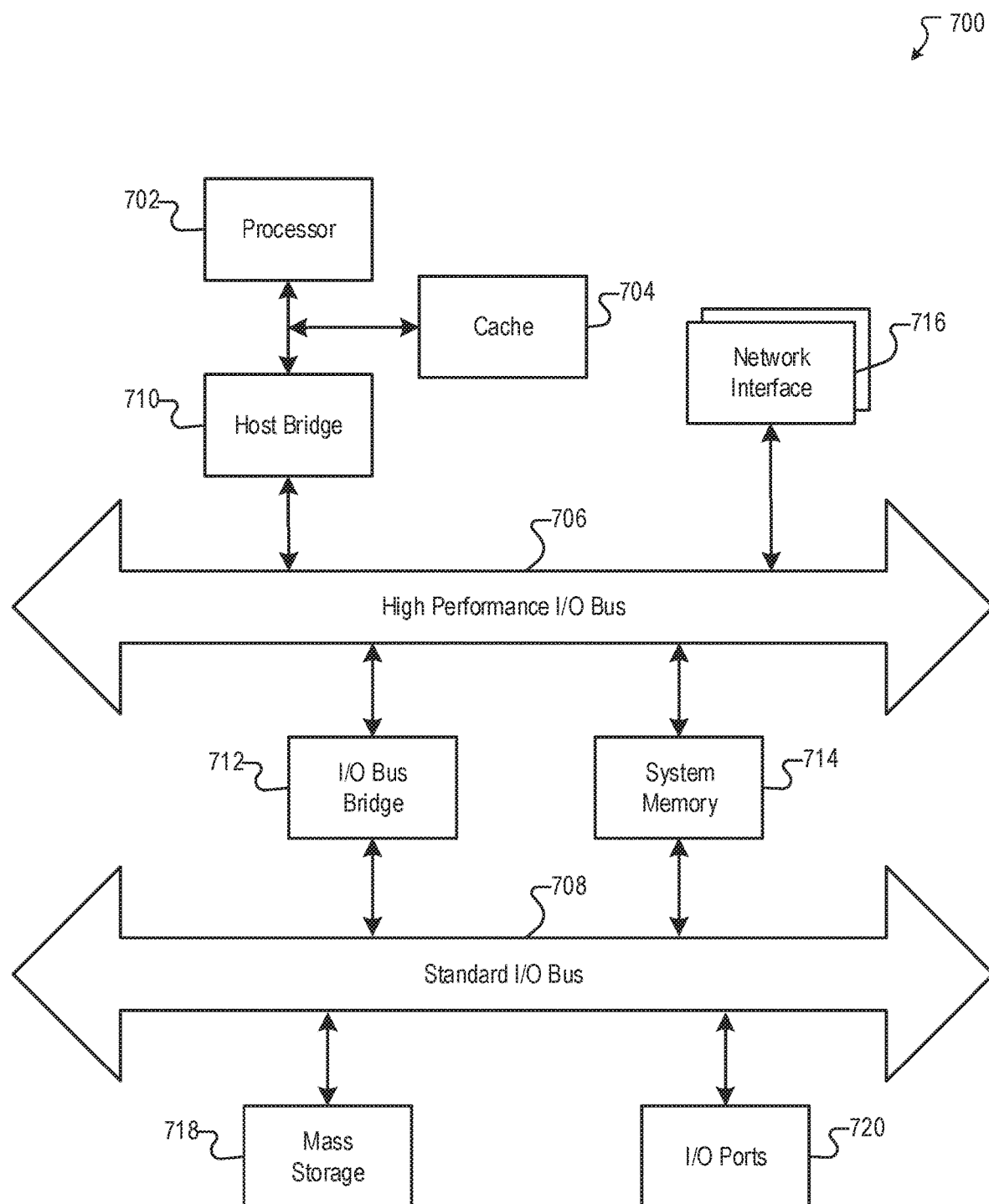
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

linking, by a computing system, a plurality of camera devices with a story on a social networking system through which media content items captured by the plurality of camera devices are published, wherein the media content items published in the story are made inaccessible after a pre-defined time interval from publication;

determining, by the computing system, at least one media content item that was captured and provided by a camera device of the plurality of camera devices, wherein the at least one media content item is associated with information identifying the linked plurality of camera devices;

determining, by the computing system, the story on the social networking system based on the information; and automatically publishing, by the computing system, the at least one media content item in the story through the social networking system.

2. The computer-implemented method of claim 1, wherein determining the story on the social networking system further comprises:

determining, by the computing system, the story linked to the camera device.

3. The computer-implemented method of claim 1, wherein determining the story on the social networking system further comprises:

determining, by the computing system, at least one mood of at least one individual represented in subject matter captured by the at least one media content item, and determining, by the computing system, the story corresponding to the at least one mood.

4. The computer-implemented method of claim 1, wherein determining the story on the social networking system further comprises:

determining, by the computing system, a point of interest associated with the camera device; and determining, by the computing system, the story corresponding to the point of interest.

5. The computer-implemented method of claim 1, wherein the camera device is configured to automatically capture and provide the at least one media content item when one or more conditions are satisfied.

6. The computer-implemented method of claim 5, wherein a given condition requires that a threshold number of individuals be present within a viewfinder of the camera device.

7. The computer-implemented method of claim 5, wherein a given condition requires that a threshold number of individuals present within a viewfinder of the camera device satisfy a facial expression requirement.

8. The computer-implemented method of claim 1, the method further comprising:
determining, by the computing system, a live content stream being captured and provided by the camera device; and
publishing, by the computing system, the live content stream through the social networking system.

9. The computer-implemented method of claim 1, the method further comprising:
determining, by the computing system, one or more users represented in subject matter captured by the at least one media content item; and
providing, by the computing system, the at least one media content item in one or more messages sent to the one or more users, the messages being sent through the social networking system.

10. The computer-implemented method of claim 9, the method further comprising:
determining, by the computing system, one or more other users related to a given user represented in subject matter captured by the at least one media content item, wherein the other users are not represented in the captured subject matter; and
providing, by the computing system, the at least one media content item in one or more messages sent to the other users, the messages being sent through the social networking system.

11. A system comprising:
at least one processor; and
a memory storing instructions that, when executed by the at least one processor, cause the system to perform:
linking a plurality of camera devices with a story on a social networking system through which media content items captured by the plurality of camera devices are published, wherein the media content items published in the story are made inaccessible after a pre-defined time interval from publication;
determining at least one media content item that was captured and provided by a camera device of the plurality of camera devices, wherein the at least one media content item is associated with information identifying the linked plurality of camera devices;
determining, by the computing system, the story on the social networking system based on the information; and
automatically publishing the at least one media content item in the story publishable through the social networking system.

12. The system of claim 11, wherein determining the story on the social networking system further causes the system to perform:
determining the story linked to the camera device.

13. The system of claim 11, wherein determining the story on the social networking system further causes the system to perform:
determining at least one mood of at least one individual represented in subject matter captured by the at least one media content item, and
determining the story corresponding to the at least one mood.

14. The system of claim 11, wherein determining the story on the social networking system further causes the system to perform:
determining a point of interest associated with the camera device; and
determining the story corresponding to the point of interest.

15. The system of claim 11, wherein the camera device is configured to automatically capture and provide the at least one media content item when one or more conditions are satisfied.

16. A non-transitory computer-readable storage medium including instructions that, when executed by at least one processor of a computing system, cause the computing system to perform a method comprising:
linking a plurality of camera devices with a story on a social networking system through which media content items captured by the plurality of camera devices are published, wherein the media content items published in the story are made inaccessible after a pre-defined time interval from publication;
determining at least one media content item that was captured and provided by a camera device;
determining the story on the social networking system based on the information; and
automatically publishing the at least one media content item in the story publishable through the social networking system.

17. The non-transitory computer-readable storage medium of claim 16, wherein determining the story on the social networking system further causes the computing system to perform:
determining the story linked to the camera device.

18. The non-transitory computer-readable storage medium of claim 16, wherein determining the story on the social networking system further causes the computing system to perform:
determining at least one mood of at least one individual represented in subject matter captured by the at least one media content item, and
determining the story corresponding to the at least one mood.

19. The non-transitory computer-readable storage medium of claim 16, wherein determining the story on the social networking system further causes the computing system to perform:
determining a point of interest associated with the camera device; and
determining the story corresponding to the point of interest.

20. The non-transitory computer-readable storage medium of claim 16, wherein the camera device is configured to automatically capture and provide the at least one media content item when one or more conditions are satisfied.

* * * * *